United States Patent
Madhavan

(10) Patent No.: US 10,715,393 B1
(45) Date of Patent: Jul. 14, 2020

(54) CAPACITY MANAGEMENT OF COMPUTING RESOURCES BASED ON TIME SERIES ANALYSIS

(71) Applicant: Goldman Sachs & Co. LLC, New York, NY (US)

(72) Inventor: Mukundan Madhavan, Bangalore (IN)

(73) Assignee: Goldman Sachs & Co. LLC, New York, NY (US)

(*) Notice: Subject to any disclaimer, the term of this patent is extended or adjusted under 35 U.S.C. 154(b) by 0 days.

(21) Appl. No.: 16/295,884

(22) Filed: Mar. 7, 2019

Related U.S. Application Data

(60) Provisional application No. 62/794,484, filed on Jan. 18, 2019.

(51) Int. Cl.
*H04L 12/24* (2006.01)
*H04L 12/26* (2006.01)

(52) U.S. Cl.
CPC .......... *H04L 41/0896* (2013.01); *H04L 41/16* (2013.01); *H04L 43/0882* (2013.01); *H04L 43/106* (2013.01)

(58) Field of Classification Search
CPC .... H04L 41/0896; H04L 41/16; H04L 43/106
USPC ....................................................... 709/223
See application file for complete search history.

(56) References Cited

U.S. PATENT DOCUMENTS

| | | | | |
|---|---|---|---|---|
| 6,731,990 B1* | 5/2004 | Carter | ................. | G05B 13/026 700/52 |
| 8,264,963 B2* | 9/2012 | Ekelin | .................... | H04L 43/10 370/235 |
| 8,732,291 B2* | 5/2014 | Zhu | ....................... | H04L 67/303 709/223 |
| 2004/0254760 A1 | 12/2004 | Takeuchi et al. | | |
| 2014/0122403 A1* | 5/2014 | Huang | ................... | G06Q 10/04 706/45 |

(Continued)

FOREIGN PATENT DOCUMENTS

EP 3401789 A1 11/2018

OTHER PUBLICATIONS

Farhath, Z.A. et al., "A Survey on ARIMA Forecasting Using Time Series Model," International Journal of Computer Science and Mobile Computing, Aug. 2016, pp. 104-109, vol. 5, No. 8.

(Continued)

*Primary Examiner* — Leon Y Tseng
(74) *Attorney, Agent, or Firm* — Fenwick & West LLP

(57) ABSTRACT

An online system receives time series data and analyzes the data for identifying trend changes or level shifts in the time series. The time series data may describe resource utilization of systems, for example, bandwidth of computer networks. The online system uses prediction models, for example, machine learning based prediction models using regression to predict data values for the time series. The online system determines error residue values based on difference between predicted data values and actual data values of the time series. The online system determines level change in the error residue to identify change-points representing trend changes or level-shifts in the original time-series. The online system takes corrective action based on the change-point information and the trend following the occurrence of the change-point, for example, sending alerts or instructions for causing reconfiguration of the systems such as the computer network.

44 Claims, 12 Drawing Sheets

(56) References Cited

U.S. PATENT DOCUMENTS

| | | |
|---|---|---|
| 2014/0136454 A1 | 5/2014 | Hirade |
| 2016/0255109 A1 | 9/2016 | Koyanagi et al. |
| 2018/0052804 A1 | 2/2018 | Mikami et al. |
| 2019/0007410 A1* | 1/2019 | Hu .................... H04L 63/10 |

OTHER PUBLICATIONS

Gallagher, C. et al., "Changepoint Detection in Climate Time Series with Long-Term Trends," Journal of Climate, Jul. 2013, pp. 4994-5006, vol. 26, No. 14.

Gardner, JR., E. S., "Exponential Smoothing: The State of the Art", Journal of Forecasting, 1985, pp. 1-28, vol. 4, No. 1.

Hoerl, A. E. et al.., "Ridge Regression: Biased Estimation for Nonorthogonal Problems," Technometrics, Feb. 1970, pp. 55-67, vol. 12, No. 1.

Leys, C. et al., "Detecting outliers: Do not use standard deviation around the mean, use absolute deviation around the median," Journal of Experimental Social Psychology, 2013, pp. 764-766, vol. 49, No. 4.

Malhotra, P. et al., "Long Short Term Memory Networks for Anomaly Detection in Time Series," European Symposium on Artificial Neural Networks, ESANN 2015 proceedings, Apr. 22-24, 2015, six pages, Bruges, Belgium.

Murtagh, F., "A Survey of Recent Advances in Hierarchical Clustering Algorithms," The Computer Journal, 1983, pp. 354-359, vol. 26, No. 4.

PCT International Search Report and Written Opinion, PCT Application No. PCT/IB2020/050389, dated Apr. 24, 2020, 10 pages.

* cited by examiner

CAPACITY MANAGEMENT OF COMPUTING RESOURCES BASED ON TIME SERIES ANALYSIS

CROSS-REFERENCE TO RELATED APPLICATION

This application claims the benefit of U.S. Provisional Application No. 62/794,484, filed on Jan. 18, 2019, which is hereby incorporated by reference in its entirety.

BACKGROUND

The disclosure relates to time series analysis of data in general and more specifically to capacity management of computing resources based on time series analysis of the computing resource data.

Capacity management is a significant challenge in computing systems. For example, computer networks can be complex systems that often involve tens of thousands of computing devices, routers, and storage devices. Computer networks used for critical applications are typically required to support high availability and reliability. Capacity management is a significant challenge in such distributed systems. While it is undesirable in terms of cost to over-provision such computing systems, it is also critical to prevent outages due to resource shortage. Conventional techniques for capacity management resort to manual capacity monitoring in such systems. Such manual capacity monitoring techniques are often ineffective and result in frequent capacity-related outages in such computing systems due to the scale and complexity involved.

Computing system outages, for example, computer network outages manifest in two different patterns. Some outages are sudden, for example, outages spanning minutes or hours that may result from unmonitored external events like demand surges. Such outages require immediate corrective action. Other capacity-related outages of computing systems may result from gradual build-up in utilization over long periods of time, for example, days or months. Such outages can be mitigated ahead of time due to their predictable nature. Mitigating such outages often requires hardware upgrades that may take significant time, for example, weeks.

Conventional techniques based on time series analysis often do not perform accurate analysis of the data to allow accurate prediction of such computing system outages. For example, utilization telemetry time-series in real networks often contains various time-series artifacts which need to be handled for making such predictions accurately. For example, in addition to trends, utilization telemetry might contain various spikes (or) outliers which can detract from prediction performance. Similarly, the utilization telemetry can contain change-points.

A change-point represents a change in a series and comprises a sudden and permanent level-shifts and/or trend changes which need to be handled for good prediction performance. The term permanent refers to a change that lasts for more than a threshold length of time, for example, longer than a spike. A change-point may be followed by a second change-point after certain time interval resulting a second sudden and permanent level-shift and/or trend change. It is necessary to explicitly detect and handle these artifacts during prediction to be able to accurately predict or detect outages. Although conventional techniques are able to detect outliers, conventional techniques fail to detect a change-point efficiently and accurately. For example, conventional averaging based techniques are unable to handle the presence of trends in the time-series. Other conventional statistical analysis based change-point detection techniques require hundreds of samples before and after a change-point to be able to detect it.

In applications where large numbers of samples are available, such techniques are computationally inefficient since they require processing of large number of samples, thereby requiring large amount of computational resources. In settings such as infrastructure telemetry modelling, the time-series data often has limited size, for example, only 40-50 samples in total that contain both change-points as well as trends. The limited data size of the time series is typically not sufficient for accurately analyzing the data for several conventional statistical techniques. Therefore such conventional techniques are often inadequate and fail to predict outages correctly, in turn, preventing the initiation of appropriate action in time.

SUMMARY

Described embodiments perform analysis of time series data to determine trend changes or level shifts in the data. The time series data may represent resource utilization of a system, for example, bandwidth utilization of a computer network. The system determines whether there is a trend change or level shift in the time series data. For example, a trend change or level shift may cause steady or sudden increase (respectively) in bandwidth utilization of a computer network, thereby resulting in network outage. The system takes corrective actions if a trend change or level shift is determined and the resulting trend or level after the change can result in an outage.

In an embodiment, the system receives network data representing communications in a computer network. In some embodiments, the network data represents link utilization measurements representing data transfer rate between routers or other devices in the computer network. The system determines a time series representing the network data. The time series comprises a sequence of data values, each data value associated with a timestamp. The system accesses a first prediction model configured to receive a value representing a timestamp as input and outputs a data value of the time series corresponding to the timestamp. The system predicts a plurality of data values of the time series using the machine learning based prediction model. For each of the plurality of predicted data values, the system determines an error residue value representing the difference between the predicted data value and the actual data value of the time series. The system determines a change-point based on the error residue values. The change point is represented by a change in an aggregate measure of level of the error residue. In an embodiment, the system determines a second prediction model based on data values of the timestamp that occur after the change point and performs a corrective action for the computer network based on predictions made by the second prediction model. Examples of corrective actions include automatically reconfiguring the network to accommodate the change in network load or sending an alert to an administrator to take corrective action.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter. In an embodiment, the system receives data associated with storage usage of one or more storage systems. The system determines a time series representing storage utilization of the one or more storage system based on the received data. The time series comprises a sequence of data values, each data value associated with a timestamp value and representing a metric indicating storage utilization of the one or more storage systems at the time represented by the timestamp value. The system accesses a prediction model configured to receive an input timestamp value and predict a value of the metric representing storage utilization of the one or more storage systems at the time represented by the input timestamp value. The system predicts a plurality of data values of the time series using the prediction model. For each of the plurality of predicted data values, the system determines an error residue value representing a measure of difference between the predicted data value and a data value of the time series. The system determines a change-point based on the error residue values. The change point represents a change in an aggregate measure of level of the error residue. The system performs a corrective action for adjusting configuration of the one or more storage systems based on the change-point.

In another embodiment, the system receives data associated with usage of resources of one or more devices. The system determines a time series representing resource utilization data based on the received data. The time series comprises a sequence of data values, each data value associated with a timestamp value and representing a metric indicating resource utilization of the one or more devices at the time represented by the timestamp value. The system accesses a prediction model configured to receive an input timestamp value and predict a value of the metric representing resource utilization of the one or more devices at the time represented by the input timestamp value. The system predicts a plurality of data values of the time series using the prediction model. For each of the plurality of predicted data values, the system determines an error residue value representing a measure of difference between the predicted data value and a data value of the time series. The system determines a change-point based on the error residue values, the change point representing a change in an aggregate measure of level of the error residue. The system performs a corrective action for adjusting resource utilization of the one or more devices based on the change-point.

In another embodiment, the system receives data describing a runtime attribute of processes executing on one or more production systems. Each production system executes on a computing device. The system determines a time series representing the run-time attribute based on the received data, the time series comprising a sequence of data values. Each data value is associated with a timestamp value and represents a metric based on the run-time attribute at the time represented by the timestamp value. The system accesses a prediction model configured to receive an input timestamp value and predict a value of the metric representing resource utilization of the one or more devices at the time represented by the input timestamp value. The system predicts a plurality of data values of the time series using the prediction model. For each of the plurality of predicted data values, the system determines an error residue value representing a measure of difference between the predicted data value and a data value of the time series. The system determines a change-point based on the error residue values, the change point representing a change in an aggregate measure of level of the error residue. The system performs a corrective action for adjusting configuration of the one or more production systems based on the change-point.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Although several embodiments disclosed herein are described with respect to analysis of network data and capacity management of computer networks, the techniques disclosed herein are applicable to other applications, for example various applications related to resource management in distributed systems or any computing system, analysis of storage capacity and storage management, analysis of server utilization and management of server configurations, and so on. Furthermore, the techniques disclosed herein are applicable to data collected from other sources, for example, trend analysis of user interactions performed by various users with online systems. For example, there may be a change in trend of user interactions caused by a system upgrade or a release of an application on a new platform such as mobile devices. The techniques disclosed herein allow detection of such trend and the change in this trend for reporting purposes as well as for recommending actions to be taken. For example, if an upward trend or a sudden upward jump is observed in user interactions, the online system may recommend increasing capacity of the servers processing the user interactions.

DETAILED DESCRIPTION

Overall System Environment

Figure 1:
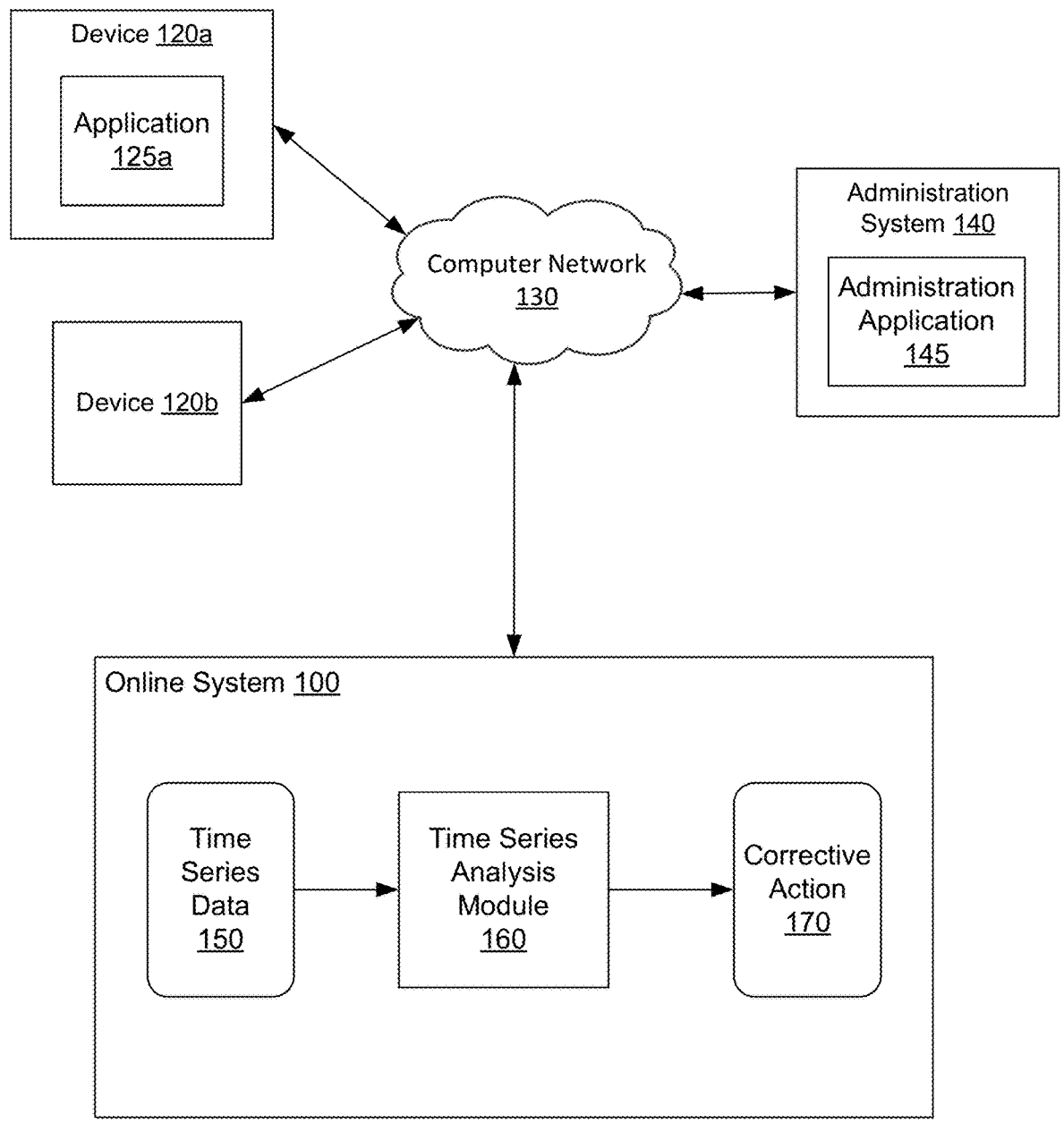
FIG. 1 shows the overall system environment for performing time series analysis, according to an embodiment.

FIG. 1 shows the overall system environment for performing time series analysis of time series data, according to an embodiment. The overall system environment includes an online system 100, one or more devices 120, an administration system 140, and network 130. An online system represents a computing system that is connected to other systems via a computer network and can communicate with the other systems via the computer network. Although embodiments are described using online systems, the techniques disclosed herein are not limited to online systems and can be performed by any system that may or may not be connected to other systems via computer networks. In other embodiments, more or less components than those indicated in FIG. 1 may be used. For example, there may be more or fewer instances of devices 120 shown in FIG. 1, for example, there may be multiple administration systems 140.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

The devices 120 represent various systems that interact with each other via the network 130. These devices may represent servers, routers, storage devices, and so on. One or more devices may be attached to peripheral devices, such as printers. The devices communicate with each other via the computer network 130. The computer network 130 may comprise any combination of local area and/or wide area networks, using both wired and/or wireless communication systems.

One or more devices monitor the data transmitted via the computer network 130 to generate time series data, for example, network data representing data transfer rate. The network data may be generated periodically, for example, every few minutes. In an embodiment, the network data comprising link utilization measurements (in bits per second) are made once-per-minute at each interface of every router in production and stored as a univariate time-series in a centralized repository.

The online system 100 receives data from the one or more devices 120 that monitor the computer network 130. The time series analysis module 160 of the online system 100 generates a time series data 150 by preprocessing the raw data received from the devices 120. The time series comprises a sequence of data values. Each data value is associated with a time point represented by a timestamp value.

The time series analysis module 160 performs trend analysis of the time series data 150 to determine whether there is a change-point in the time-series data and also determine the trend of the time-series data after this change-point. A change-point represents a sudden and permanent shift in the nature of a time-series. A change-point may manifest as an abrupt and permanent shift in the mean (also called level) of the series, a sharp change in its trend, or a sharp change in its variance. The time series analysis module 160 generates an accurate prediction model for predicting values of time series data for future time points based on the trend analysis. The online system 100 uses two different prediction models to ensure accuracy, a prediction model M1 built using the entire time series data and a prediction model M2 for making predictions for portions of the time series data that occur after the change-point. In some embodiments, the online system may also build a third prediction model M3 for modelling the portions of the time series data that occur before the change-point. Embodiments of the invention allow detection of change-points in the presence of noise, outliers, and trends, all of which are commonly observed in infrastructure telemetry.

The online system 100 uses the predicted values for determining whether a corrective action 170 is required. The online system 100 takes a corrective action 170, for example, to adjust the computer network configuration based on a new trend that may be detected by the time series analysis module 160. For example, if the new trend indicates a higher load on the computer network, the corrective action 170 may comprise sending an alert or making a recommendation to increase the network capacity. The alert may indicate a time frame within which the reconfiguration of the computer network is required so as to avoid network failures or significant degradation in performance. In an embodiment, the corrective action 170 comprises automatically reconfiguring the resources to accommodate the trend change or level shift to the extent possible. For example, if a trend change or level shift indicates a decrease in network load, the online system 100 may send signals to take some of the network components off line or repurpose them. Alternatively, if the trend change or level shift indicates an increase in network load, the online system 100 may send signals to bring back such off line components or repurpose existing components to handle the increased load.

The administration system 140 allows a privileged user, for example, a system administrator to analyze time series data and to configure systems, for example, to take corrective actions 170. The administration system 140 comprises the administration application 145 that provides a user interface for a system administrator to view reports or alerts associated with the time series analysis performed by the online system 100. The administration system 140 further allows the privileged user to perform corrective actions 170 based on the network analysis data, for example, to reconfigure one or more devices 120 or add one or more devices to increase network capacity of a distributed system or storage capacity of the distributed system. Other corrective actions that an online system 100 performs depend on the type of application that generated the time series data 150 that was analyzed.

The administration system 140 can be a conventional computer system (e.g., a desktop or laptop computer), a tablet, or a device having computer functionality such as a personal digital assistant (PDA), a mobile telephone, a smart phone or another suitable device. The devices 120 and the administration system 140 interact with the online system 100 via a network 130.

The online system 100 may be hosted on a computing system that includes one or more processors, memory, secondary storage and input/output controller. The computing system used for hosting the online system 100 is typically a server class system that uses powerful processors, large memory, and fast input/output systems compared to a typical computing system used, for example, as an administration system 140.

Figure 2:
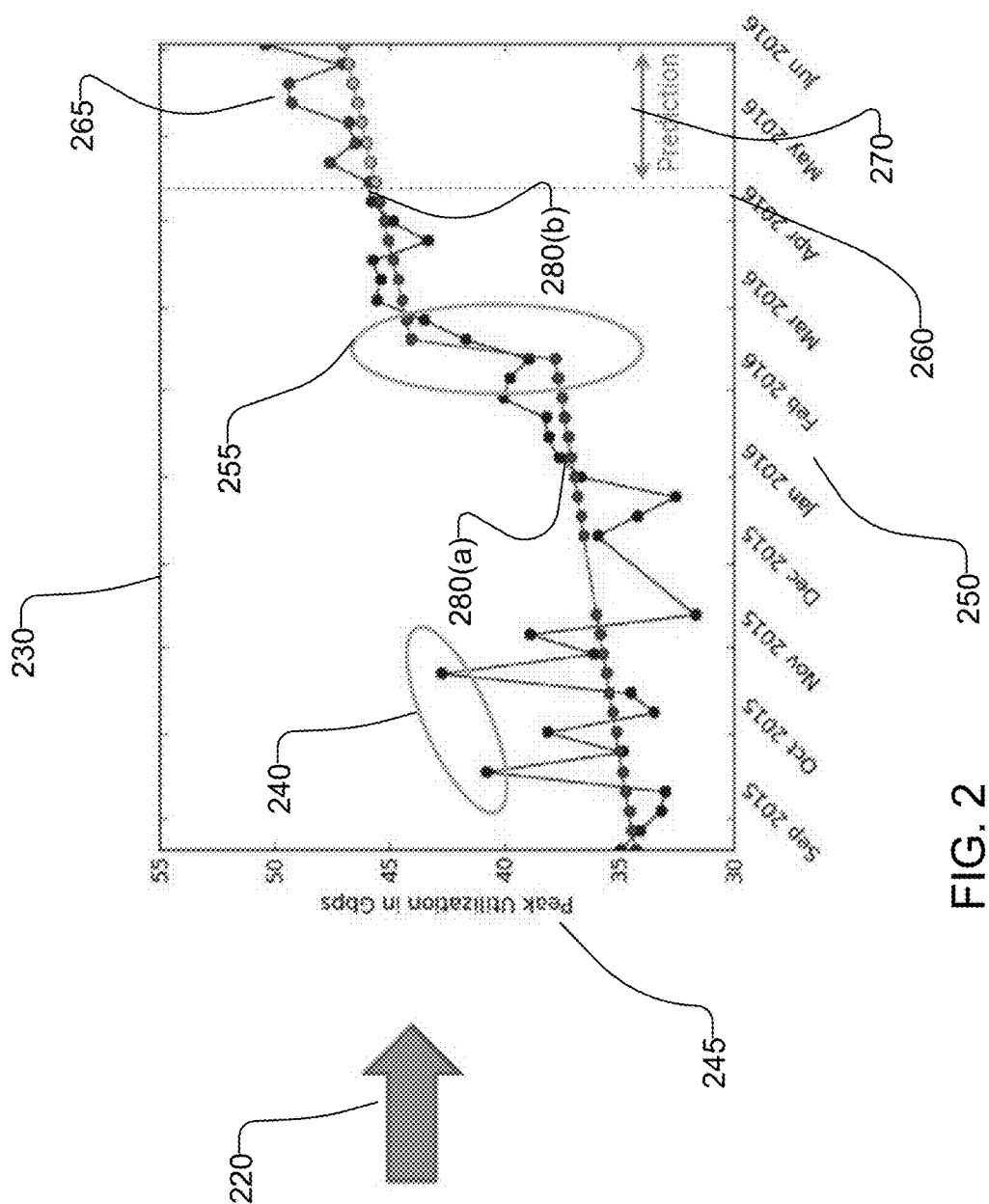
FIG. 2 shows visualization based on time series analysis performed by the online system, according to an embodiment.

FIG. 2 shows visualization based on time series analysis performed by the online system, according to an embodiment. Although FIG. 2 illustrates a specific application of the techniques disclosed herein, this description is not limiting and the techniques are applicable to various other applications. The online system 100 receives network data 210 that may represent link utilization telemetry data. The network data 210 may represent network bandwidth, for example, bits per second transmitted during a time interval and may be reported every minute or once every few minutes. The online system 100 analyzes the network data to generate 220 information describing trend analysis that may be presented via a user interface 230. The user interface 230 shows peak utilization along the Y-axis 245 and time along X-axis 250.

The online system 100 processes the network data to generate a time series that is visualized by the user interface 230. The online system 100 preprocesses data to be able to handle outliers 240 in the data. The online system 100 may handle outliers 240 by executing a de-spiking algorithm. In an embodiment, for each sample in the series, the online system 100 considers a window of size N (typical values of N may be 7-9) centered around the sample. The online system computes a statistical aggregate measure, for example, a median (r) and the median absolute deviation (MAD) of this window. Some embodiments compute the statistical measure, median filtering that replaces each sample by a median value determined using a window of neighboring values. The techniques disclosed herein are not limited to the statistical aggregate measures described herein and other statistical measures may be used. The online system 100 determines that the sample is a spike if the sample value is above a threshold, for example a threshold of (r+1.5*MAD). If the online system 100 determines that a sample is a spike, the online system replaces the sample with the median value r.

The online system 100 analyzes the network data to identify change-points 255. Once the change-point is identified, the online system 100 determines the trend 280(*a*) that occurs before the change point 255 and trend 280(*b*) that occurs after the change-point 255. The time point 260 represents a current time point and the online system 100 uses the trend 280(*b*) that occurs after the change-point 255 to predict data values of the time series in future time interval 270. The data values 265 represents the actual data values that may be observed over time.

System Architecture

Figure 3:
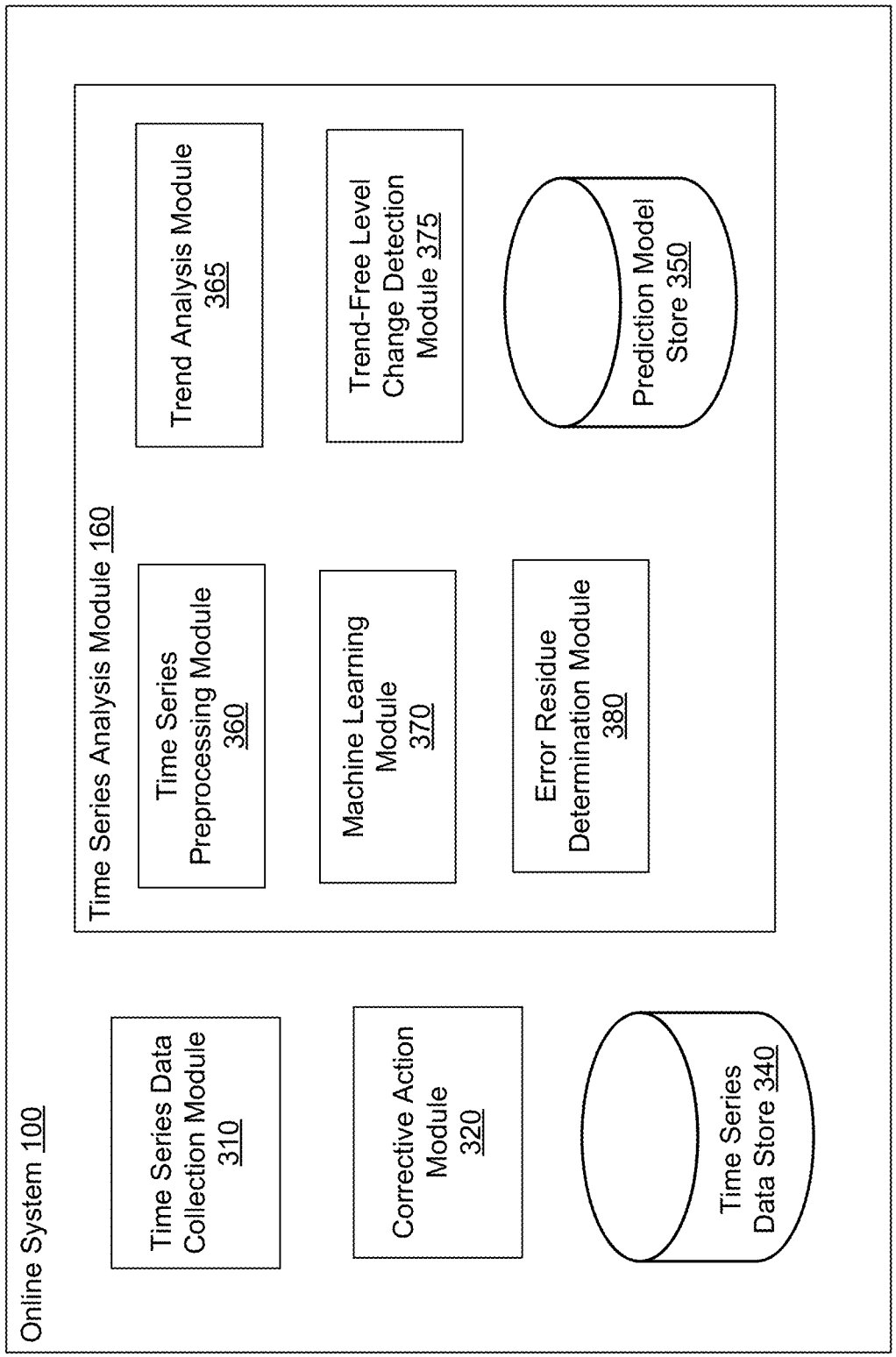
FIG. 3 shows the system architecture of the online system configured to perform time series analysis, according to an embodiment.

FIG. 3 shows the system architecture of the online system configured to perform time series analysis, according to an embodiment. The online system 100 includes a time series data collection module 310, a corrective action module 320, a time series data store 340, and a time series analysis module 160. The time series analysis module 160 further comprises, a time series preprocessing module 360, a trend analysis module 370, a machine learning module 380, a trend-free level change detection module 375, an error residue determination module 380, and a prediction model store 350. In other embodiments, the online system 100 may include other modules not described herein. Functionality indicated as provided by a particular module may be implemented by other modules instead.

The time series data collection module 160 collects data from various systems for performing time series analysis. In an embodiment, the time series data collection module 160 comprises one or more listener processes or threads that wait for receiving data from a data source. As a listener process receives data, it identifies a time series to which the data belongs and adds the data element to the time series. The time series data collection module 160 may assign a time stamp to each data element that is added to a time series.

The data collected by the time series data collection module 160 is a time series that may be processed by the online system to generate other time series for further analysis. The type of data collected may vary depending on the application of the techniques disclosed herein. For example, the time series data collection module 160 may collect network utilization data describing rates of data transmission for various network links. In other embodiments, the time series data collection module 160 may collect other types of time series data, for example, storage utilization data, server utilization data, data provided by various sensors (for example, sensors of an internet of things (IoT)), data describing rates of user interactions with one or more systems, and so on.

The time series data collected by the time series data collection module 160 is stored in the time series data store 340. The time series data store 340 may store data received as a flat file, for example, a log file that appends data at the end. In some embodiments, the time series data store 340 stores the time series data in a database, for example, a relational database, a large-scale distributed database or a database optimized to store time series data. The time series analysis module 160 may process the time series data collected by the time series collection module 310 to generate other derivative time series that may also be stored in the time series data store 340.

The time series analysis module 160 performs trend analysis on the time series data collected by the time series data collection module 310. The result of analysis performed by the time series analysis module 160 may be used by the corrective action module 320 to perform corrective actions, for example, to reconfigure one or more systems to adjust the systems to be able to handle trend-changes or level-shifts in the time-series data and the resulting trend after such events. In an embodiment, the corrective action module 320 sends an alert to one or more users, describing a trend-change, and/or a level shift along with the resulting trend after such an event and optionally information describing potential system outages that may be caused by them. The alert may be sent via email, as a text message, via an automatic phone call, or any such mechanism. In another embodiment, the corrective action module 320 generates a report describing the trend, trend-change and/or level-shift and its potential impact and sends the generated report for display via a user interface. In another embodiment, the corrective action module 320 sends instructions to a target system to automatically perform a corrective action. For example, the corrective action module 320 may send instructions to reallocate resources that are available for handling a trend change. For example, the instructions may result in diverting resources from a system S1 to another related system S2 if the trend indicates increased resource utilization of system S2. In some embodiments, the change in trend or change in level and the resulting trend may be addressed by introducing additional hardware or making certain changes that requires manual intervention. In these embodiments, the corrective action module 320 sends recommendations to a user, for example, a system administrator with information describing the changes that need to be made. The online system 100 may receive an acknowledgement after the hardware reconfiguration is performed, the acknowledgement describing the change made. In other embodiments, the corrective action module 320 repurposes previously installed hardware/software to adjust for a trend, trend change or level-shift, for example, by increasing or decreasing the amount of resources available for a particular task. For example, if a trend change or mean-shift indicates a sudden increase in amount of storage used by a set of applications, the corrective action module 320 executes instructions that cause additional storage to be allocated for the set of applications. The online system 100 may perform further trend analysis to ensure that the corrective action taken results in a subsequent trend change that either partially or fully reverses the original trend change that was likely to cause a system outage.

The time series analysis module 160 performs the analysis of time series data and comprises a time series preprocessing module 360, a trend analysis module 365, a machine learning module 370, a trend-free level change detection module 375, an error residue determination module 380, and a prediction model store 350. Other embodiments of the time series analysis module 160 may include more, fewer or different modules than those indicated herein.

The time series preprocessing module 360 performs preprocessing of time series data received from devices 120. The time series preprocessing module 360 generates new time series based on the preprocessing. The new time series generated is more suitable for further analysis, for example, the new time series may be generated by extracting relevant features from the input time series, thereby resulting in more efficient further processing. For example, if the input time series received by the time series data collection module 310 has a large number of data points, for example, one data point every minute, the time series preprocessing module 360 reduces the number of data points by determining an aggregate value for larger intervals of time, for example, once every day or once every week. In an embodiment, the time series preprocessing module 360 determines an aggregate value as a maximum of the data values of each target time interval. In other embodiments, the time series preprocessing module 360 determines the aggregate value as a percentile value of the data values of each target time interval, for example, $99^{th}$ percentile value. The use of percentile as an aggregate results in removal of momentary spikes in data. The time series preprocessing module 360 may preprocess the data of the input time series to generate a derived time series on which trend analysis is performed. As another example, the time series preprocessing module 360 may generate new time series that has values within a predetermined range as compared to the input time series, thereby allowing specific analysis techniques to be used.

In an embodiment, the time series preprocessing module 360 reduces noise data in the input time series by removing spikes representing large increases in data values for short periods of time. For each sample in the input time series, the time series preprocessing module 360 determines a statistical measure over a set of data points around the sample. Examples of statistical measures determined include median, mean, median absolute deviation but are not limited to these. The time series preprocessing module 360 determines that the sample is a spike if the data value of the sample is more than a threshold above the determined statistical measure. If the time series preprocessing module 360 determines that the sample is a spike, the time series preprocessing module 360 replaces the data value of the sample with the data value based on the statistical measure.

The trend analysis module 365 performs trend analysis of time series data, for example, by determining whether the particular time series has a change-point which embodies a trend change or a level shift. The trend analysis module 365 determines the timestamp corresponding to the location of the change-point in the particular time series. The trend analysis module 365 also determines the latest trend of the time-series, accounting for the effects of the change-point, if one occurred. The process used by the trend analysis module 365 is further described herein. The trend analysis module 365 uses machine learning based prediction modules for determining trend change in time series data.

The machine learning module 370 trains prediction models for predicting data values for a time series. The machine learning module 370 uses available time series data as training dataset for training a prediction model. The machine learning module 370 stores trained prediction model in the prediction model store 350. In an embodiment, the prediction model represents a set of coefficient values for one or more expressions used by the prediction module. The prediction model may comprise the instructions executed for determining a predicted value for a given input.

A time series may be represented by $x_i$, where $i \in \{1, \ldots, t\}$. The machine learning module 370 generates a prediction model that takes a timestamp value as input and predicts the data value of the time series corresponding to the timestamp value. In an embodiment, the prediction model is a regression model, for example, a ridge regression model of the time-series values using the corresponding time-stamps as an independent variable. In an embodiment, the machine learning module 370 uses a numeric representation of each timestamp by representing it as an offset (for example, in seconds/minutes/hours/days depending on the series granularity) from a reference time, for example, UTC-0). The machine learning module 370 trains the prediction model using these numerical representations as the independent variable and the corresponding time-series values as the dependent variable. The machine learning module 370 may perform cross-validation to identify the correct polynomial power for the regression fit in case of ridge regression. The machine learning module 370 may also estimate other regression hyper-parameters through cross-validation.

In some embodiments, the time series analysis module 160 uses a prediction model that may not be based on machine learning. For example, the time series analysis module 160 uses curve fitting techniques to identify coefficients of a polynomial expression based on a variable representing the numeric representation of a timestamp. The time series analysis module 160 uses the polynomial expression as the prediction model.

The error residue determination module 380 determines an error residue representing the difference between a predicted value obtained using the prediction model and the actual data value of the time series. Let $y_i$, where $i \in \{1, \ldots, t\}$ represent the predictions made by the prediction model for the time-stamps $i \in \{1, \ldots, t\}$ that are already present in the input time series. The error residue determination module 380 determines the prediction error (residue) for time-stamp i as $e_i = (x_i - y_i)$, for each $i \in \{1, \ldots, t\}$.

The trend-free level change detection module 375 processes the error residues to determine if there is a level change in the data values of a time series formed by the error residues. In an embodiment, the trend-free level change detection module 375 uses an averaging based change-point detection technique to detect change-points in the error residue time series. For example, the trend-free level change detection module 375 may use a standard technique that determines cumulative sums as follows. The trend-free level change detection module 375 derives a secondary time-series from the error residues $e_i$ by using the following equation.

$$CUSUM_p = \frac{1}{\sqrt{t}} \left( \sum_{i=1}^{p} e_i - \frac{p}{t} \sum_{i=1}^{t} e_i \right), p \in \{1, \ldots, t\}$$

In the above equation, the term $CUSUM_p$ represents the $p^{th}$ term of the secondary time-series derived from the error residue time series. The term $\Sigma_{i=1}^{p} e_i$ represents an aggregate sum of all error residue terms from the first error residue term to the $p^{th}$ error residue term. The term t represents a count of all the terms in the error residue time series. The term $$\frac{p}{t} \sum_{i=1}^{t} e_i$$

represents an estimate of the $p^{th}$ cumulative aggregate value determined based on an aggregate across all the t error residue terms. The trend-free level change detection module 375 derives the test statistic $$C = \frac{\max_{1 \leq p \leq t} |CUSUM_p|}{\sigma}$$

where σ denotes the variance of $e_i$ under the null-hypothesis of no change-points. If C exceeds a critical value of 1.358, the time-series $e_i$ has a mean-shift change-point with 95% confidence. The location of this change-point is given by the index p at which $CUSUM_p$ is maximum. The trend analysis module 365 determines that the location of mean-shift change-point in $e_i$ (if one exists) coincides with the location of the trend-change/mean-shift change-point in the original time-series $\{x_i\}$. In other embodiments, the trend-free level change detection module 375 uses other techniques to determine if there is a level change in the data values of a time series formed by the error residues.

Processes for Detecting Trend Change in Time Series Data

Various processes based on trend analysis of time series are described herein. The steps of processes described herein may be performed in an order different from that indicated herein, to the extent permitted by the data flow of the process. The steps may be performed by modules other than those indicated herein.

Figure 4:
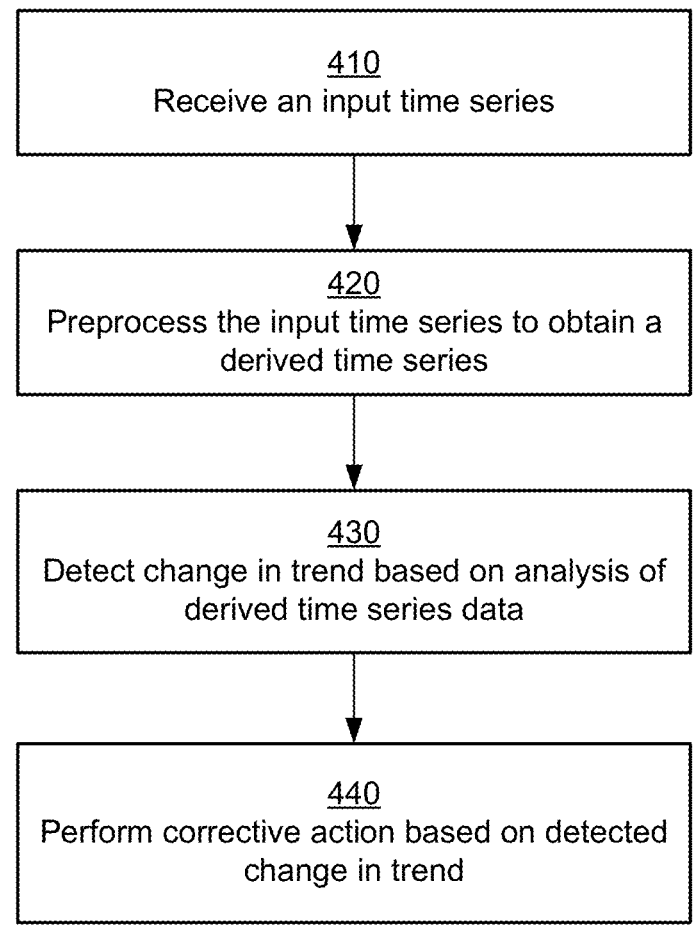
FIG. 4 shows a flowchart illustrating the process for analyzing time series data, according to an embodiment.

FIG. 4 shows a flowchart illustrating the process for analyzing time series data, according to an embodiment. The time series data collection module 310 receives 410 data representing an input time series. The input time series may comprise data values such that each data value represents resource utilization of a system, for example, network bandwidth of a computer network, storage utilization of a distributed system, server utilization of a system, and so on. In other embodiments, the input time series may represent data that is not limited to resource utilization. For example, the input time series may represent sensor data collected from a plurality of sensors or data representing user interactions with one or more systems.

The time series preprocessing module 360 preprocesses 420 the input time series to obtain a derived time series. The time series preprocessing module 360 may preprocess the input time series to reduce the number of data points of the time series. For example, time series preprocessing module 360 may preprocess the input time series to eliminate spikes representing momentary bursts in the data values of the time series. Alternatively, the time series preprocessing module 360 may preprocess the input time series to reduce the number of data values that are processed by replacing a plurality of input values with a single value, for example, a statistical measure based on the plurality of input values.

The trend analysis module 365 performs the analysis of the derived time series by detecting 430 change-points in the series. The trend analysis module 365 further performs trend estimation and/or detects mean shift responsive to detecting trend changes. The trend analysis module 365 may invoke other modules of the online system for performing the trend analysis. The details of the analysis performed by the trend analysis module 365 are further described in connection with the flowchart illustrated in FIG. 5.

The corrective action module 320 performs 440 a corrective action based on the trend analysis performed by the trend analysis module 365. In particular, if the corrective action module 320 determines that the change-point or the trend following it may result in some undesirable consequences, for example, system outage, the corrective action module 320 takes an action to prevent these consequences. The corrective action module 320 may send the information describing the change-point and the trend following it to a user as an alert or as a report presented on a user interface. Alternatively, the corrective action module 320 may send instructions to one or more systems to take remedial actions, for example, reconfiguration of one or more systems to prevent any undesirable consequences of the change-point.

Figure 5:
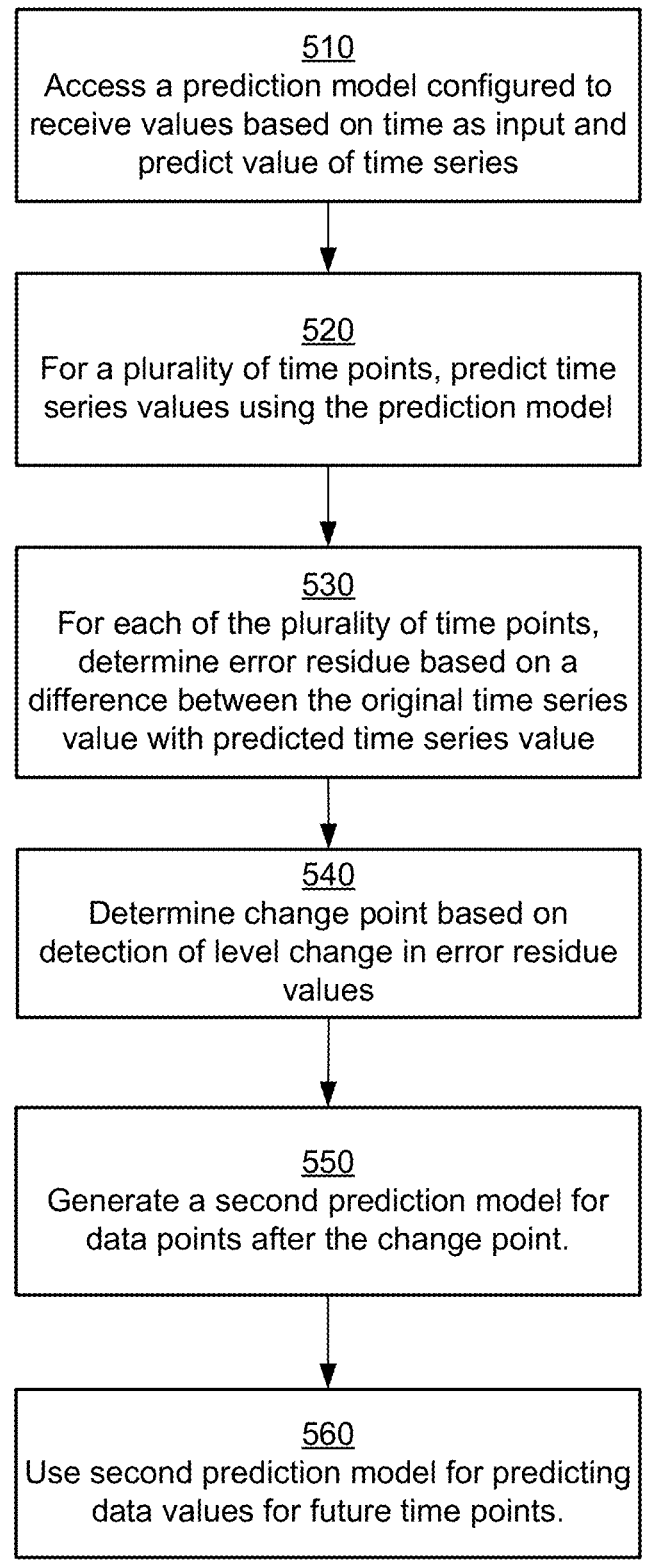
FIG. 5 shows a flowchart illustrating the process for performing trend analysis of a time series, according to an embodiment.

FIG. 5 shows a flowchart illustrating the process for performing trend analysis of a time series, according to an embodiment. The trend analysis module 365 accesses 510 a prediction model, for example, by loading the prediction model from the prediction model store 350. The prediction model is configured to receive values based on time as input and predict values of a time series. The trend analysis module 365 predicts 520 time series values using the prediction model for a plurality of time points.

The prediction model may be a machine learning based model but is not limited to such models. For example, the prediction model may be a polynomial function obtained by applying curve fitting techniques through a set of values of the time series. In some embodiments, the online system trains a machine learning based prediction model based on training data comprising time series data received so far. For example, the training data may comprise a set of consecutive values of the time series and one or more values occurring after the set of consecutive values is provided as labeled data set for training the model. A machine learning based prediction model comprises a set of weights that are obtained as a result of training the model. In an embodiment, the machine learning based prediction model comprises the set of weights and instructions for taking input values and predicting the output values using the set of weights.

The trend analysis module 365 invokes the error residue determination module 380 to determine 530 error residue for each of the plurality of time points. The error residue value represents a difference between the original time series value and the predicted time series value. The trend analysis module 365 invokes the trend-free level change detection module 375 to determine a time point representing a change in level in the error residue values. The trend analysis module 365 determines 540 a change point based on the determined level change in error residue values.

In an embodiment, the time series analysis module 160 generates 550 a second prediction model based on data values of the time series that occur after the change point. For example, the machine learning module 370 may train a second machine learning based prediction model using training data set obtained from data values of the time series that occur after the change point. The online system 100 uses 560 the second prediction model for predicting data values for future time points that occur after the change point.

Processes Illustrating Applications of Trend Analysis

In some embodiments, the online system uses the trend detection techniques disclosed herein for performing capacity management for a particular hardware resource, for example, in applications where high availability is expected but capacity is kept as low as possible to minimize costs. In these embodiments, the online system 100 receives information describing past telemetry about the resource's utilization as input and trains predictions models configured to predict future peak utilization of the resource. Accordingly, the online system determines the required capacity of a particular resource in the future based on current trends. The online system uses the analysis to take corrective actions that appropriately upgrade the system configuration to allow for increased resource availability. Alternatively, the online system may take corrective actions to control the excessive resource usage. For example, an online system that processes requests may throttle the requests to reduce the load on the system, thereby reducing the resource consumption.

Examples of resource management performed by online systems based on trend-change or level-shift detection and resulting trend estimation techniques disclosed herein include: management of utilization of local disks, management of utilization of network mounted disks and storage systems such as disk filers (e.g., NETAPP, HP, SOLIDFIRE filers), management of network link utilization, management of utilization of log space in database servers, and so on.

Capacity Management of Networks

Figure 6:
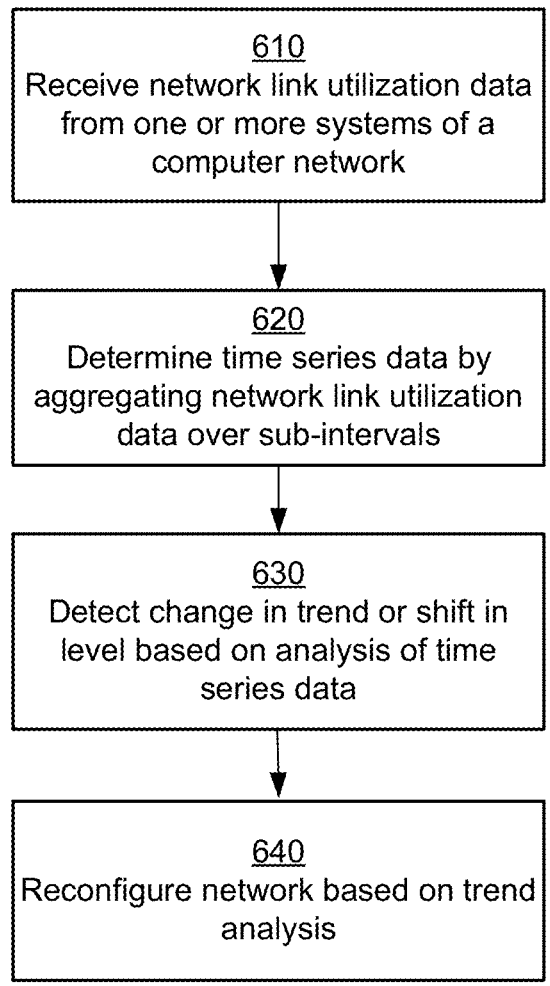
FIG. 6 shows a flowchart illustrating the process for analyzing network utilization data, according to an embodiment.

FIG. 6 shows a flowchart illustrating the process for analyzing network utilization data, according to an embodiment. The time series data collection module 310 receives 610 network link utilization data from one or more devices associated with a computer network, for example, one or more computing devices that are communicating via the computer network or one or more routers that form part of the computer network. Network utilization may refer to a percentage of a network's bandwidth that is currently being consumed by network traffic.

The time series preprocessing module 360 preprocesses the input time series to obtain a derived time series. For example, the time series preprocessing module 360 determines 620 the derived time series data by aggregating network link utilization data over sub-intervals. The trend analysis module 365 performs trend analysis of the derived time series and detects 630 changes in the trend or shifts in the level of network utilization and estimates the series trend after their occurrence based on the trend analysis. The trend analysis module 365 uses processes illustrated in FIGS. 4-5 for performing the trend analysis.

The corrective action module 320 performs 640 corrective actions based on the trend analysis performed by the trend analysis module 365. For example, the corrective action module 320 may send the information describing the trend change or level shift and the trend following its occurrence in the network utilization data or a potential outage likely due to trend change or level-shift and the trend following its occurrence to a system administrator as an alert or as a report presented via a user interface. Alternatively, the corrective action module 320 sends instructions to one or more systems to take remedial actions, for example, reconfiguration of one or more systems of the computer network to prevent network outages likely to be caused by these events. The reconfiguration may increase available network bandwidth for specific links.

Capacity Management of Storage Systems

Figure 7:
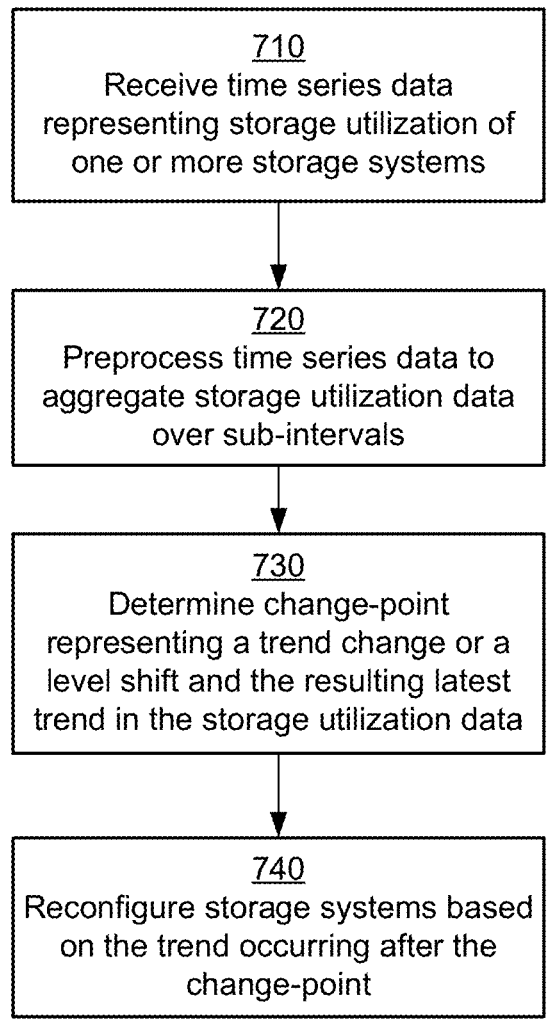
FIG. 7 shows a flowchart illustrating the process for analyzing storage utilization data, according to an embodiment.

FIG. 7 shows a flowchart illustrating the process for analyzing storage utilization data, according to an embodiment. The time series data collection module 310 receives 710 storage utilization data from one or more systems associated with a distributed network, for example, one or more storage systems that store data. The time series preprocessing module 360 preprocesses the input time series to obtain a derived time series. For example, the time series preprocessing module 360 determines 720 the derived time series data by aggregating storage utilization data over sub-intervals, or by eliminating outliers in the input time series.

The trend analysis module 365 performs the analysis of the derived time series by detecting 730 trends, changes in the trends or shifts in the level and estimating the trend following its occurrence. The corrective action module 320 performs 740 corrective actions based on the trend analysis performed by the trend analysis module 365, for example, by reconfiguration 640 of the storage systems on the trend analysis. For example, the corrective action module 320 may send the information describing the trend change or level shift and the trend following its occurrence in the storage utilization data or a likelihood of one or more systems running out of storage due to the trend change or level-shift and the trend following its occurrence to a system administrator as an alert or as a report presented via a user interface. Alternatively, the corrective action module 320 sends instructions to one or more storage systems to take remedial actions, for example, reallocate storage units or request addition of new storage unit.

Capacity Management of Resources

In an embodiment the online system uses the trend analysis techniques disclosed herein to perform analysis of any type of resource utilization of various components of a computing system. Examples of resource utilization include network utilization and storage utilization as described in connection with FIG. 5 and FIG. 6 and can include other hardware resources, for example, processing power analyzed based on an aggregate CPU utilization for a computing system, and aggregate memory usage of the computing system, and so on.

Figure 8:
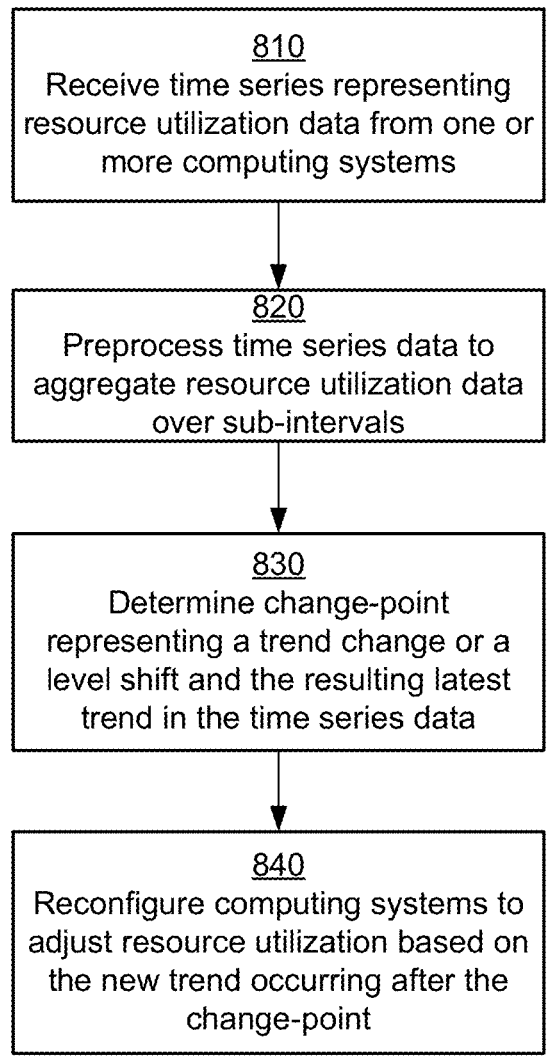
FIG. 8 shows a flowchart illustrating the process for analyzing time series data representing resource utilization, according to an embodiment.

FIG. 8 shows a flowchart illustrating the process for analyzing resource utilization data, according to an embodiment. The time series data collection module 310 receives 810 time series data associated with usage of resources of one or more devices. The time series preprocessing module 360 preprocesses the input time series to obtain a derived time series representing resource utilization data based on the received data. For example, the time series preprocessing module 360 determines 820 the derived time series data by aggregating resource utilization data over sub-intervals. The time series comprises a sequence of data values, each data value associated with a timestamp value and representing a metric indicating resource utilization of the one or more devices at the time represented by the timestamp value.

The trend analysis module 365 accesses a prediction model configured to receive an input timestamp value and predict a value of the metric representing resource utilization of the one or more devices at the time represented by the input timestamp value. The trend analysis module 365 predicts a plurality of data values of the time series using the prediction model. For each of the plurality of predicted data values, the trend analysis module 365 determines an error residue value representing a measure of difference between the predicted data value and a data value of the time series. The trend analysis module 365 determines 830 a change-point based on the error residue values and estimates the trend following its occurrence. The change point represents a change in an aggregate measure of level of the error residue.

The corrective action module 320 performs a corrective action for adjusting resource utilization of the one or more devices based on the change-point and the trend that follows it. For example, the corrective action module 320 reconfigures computing systems to adjust resource utilization based on the new trend occurring after the change-point. For example, the corrective action module 320 may recommend upgrading the system to add additional resources, for example, processors or memory. Alternatively, the corrective action module 320 may execute instructions that cause the system to adjust allocation of system resources to accommodate the updated trend after the change-point.

Monitoring Processes Executing on Production Systems

In an embodiment the online system uses the trend analysis techniques disclosed herein to perform monitoring of various run-time aspects of processes executing on computing systems by tracking telemetry for the system being analyzed in the long run. In an embodiment, the processes execute on production systems, for example, online systems receiving and processing requests from client devices. A production system is distinct from a system used for test or development that has limited set of users. For example, the users of a test system may be testers and users of a development system may be developers. In contrast users of a production system may be customers of an enterprise. Production systems run processes for processing requests received from customers.

The programs comprising instructions for these processes executing on production systems may be instrumented by including instructions that upon execution send specific data to a system configured to receive the data. For example, the instrumented process may send data including but not limited to: average CPU utilization of a server, average memory usage in a server; average number of packets discarded in a network link, average packet latency of a network link, number of connections coming into a firewall or gateway, number of connections made to messaging brokers, number of connections made to a database, and so on. The data may be received periodically at a regular or irregular time interval and forms a time series. The trend analysis module 365 analyzes the received data and determines whether there is a trend change or level shift and takes corrective actions if it detects a significant trend change or level shift or if the latest trend following the change-point needs corrective action.

Figure 9:
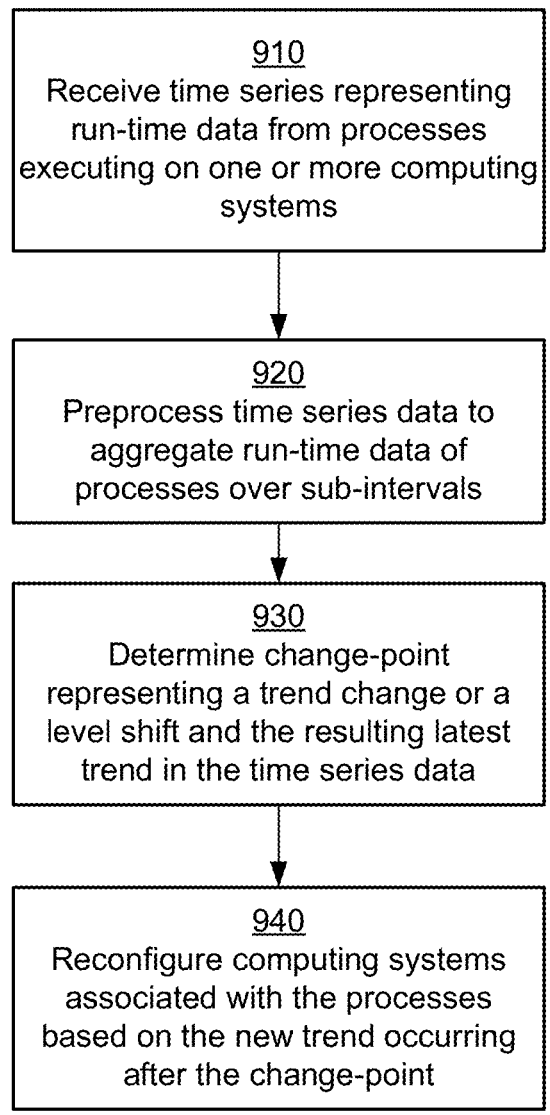
FIG. 9 shows a flowchart illustrating the process for analyzing run-time data from processes executing on one or more computing systems, according to an embodiment.

FIG. 9 shows a flowchart illustrating the process for analyzing run-time data describing attributes of processes associated with production systems, according to an embodiment. The time series data collection module 310 receives 910 time series data describing run-time attributes of processes executing on production systems. The time series preprocessing module 360 preprocesses the input time series to obtain a derived time series representing resource utilization data based on the received data. For example, the time series preprocessing module 360 determines 920 the derived time series data by aggregating run-time attributes data over sub-intervals. The time series comprising a sequence of data values, each data value associated with a timestamp value and representing a metric indicating resource utilization of the one or more devices at the time represented by the timestamp value.

The trend analysis module 365 accesses a prediction model configured to receive an input timestamp value and predict a value of the metric representing the run-time attribute at the time represented by the input timestamp value. The trend analysis module 365 predicts a plurality of data values of the time series using the prediction model. For each of the plurality of predicted data values, the trend analysis module 365 determines an error residue value representing a measure of difference between the predicted data value and a data value of the time series. The trend analysis module 365 determines 930 a change-point based on the error residue values and the trend that follows it. The change point represents a change in an aggregate measure of level of the error residue.

The corrective action module 320 performs a corrective action for reconfiguring 940 the production systems based on the change-point. For example, the change-point and the resulting trend may indicate an increase in memory usage of production system as a result of increase in received requests and the corrective action module 320 may send a request recommending additional memory to be installed in the production system. Alternatively, the corrective action module 320 may automatically reconfigure the production system to increase memory available for specific processes based on the new trend occurring after the change-point. As another example, the trend change or level shift and the resulting trend may indicate an increase in number of connections created by the production system (e.g., connection made to database or connections made to a messaging broker) the corrective action module 320 may recommend adjusting the database (or messaging broker) configuration to accommodate the increase in the number of connections.

In an embodiment, the online system uses past utilization time-series (for example minute-wise telemetry of memory consumed on server) as input, to model long-term growth in average memory used on the server every day. The corrective action module 320 takes corrective actions based on this information (growth rate and future predictions) depending on the exact use-case. For example, in case of the change-point and resulting trend indicating increased use of CPU, the corrective action upgrades the number of cores in the server. In case of the change-point and the resulting trend indicating an increase in number of network packets discarded in a link, the corrective action either modifies the scheduler of associated routers or upgrades the underlying physical layer (say from cable to fiber). In case of the change-point indicating an increase in number of DB connections, the corrective action changes the rate-limiting rules for number of connections from specific entities.

Monitoring Task Completion in Computing Systems

Embodiments of the invention monitor job completion of tasks, for example, tasks executed periodically by computing systems. For example, production systems often have many scheduled tasks which must complete within a certain SLA (service level agreement) or deadline (for example, jobs which compute risk numbers to be reported to regulators on a daily basis, or tasks that compute liquidity requirements daily). The head-room of the task is the gap in time by the task is completed ahead of its deadline. Over time, the head-rooms of tasks tend to drop progressively (because their input loads grows over time) and the tasks start missing their SLAs. Embodiments model a task's headroom based on past data about the completion times. If the system detects a change-point, the system takes corrective action, for example, by upgrading the computing system executing the job before the task's completion starts breaching SLA, or re-factor code corresponding to the task to increase efficiency, and so on.

Figure 10:
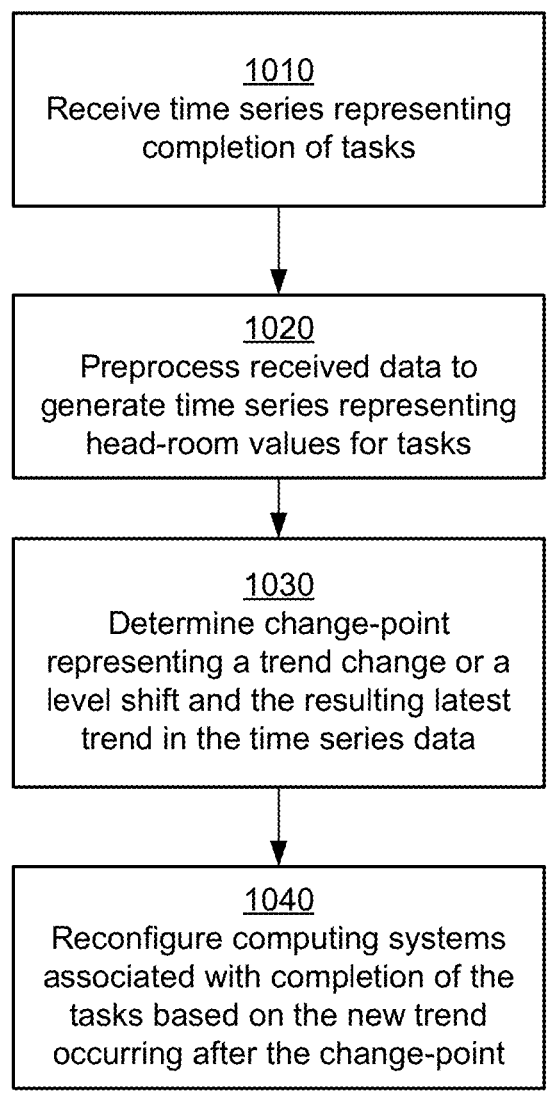
FIG. 10 shows a flowchart illustrating the process for analyzing time series data representing completion of tasks, according to an embodiment.

FIG. 10 shows a flowchart illustrating the process for analyzing data describing completion of tasks, according to an embodiment. The time series data collection module 310 receives 1010 data describing completion of tasks. The tasks may be executed by computing systems. Each task is associated with a deadline for completing the task. The time series preprocessing module 360 preprocesses 1020 the input time series to obtain a derived time series representing head-room values based on the received data. The time series comprising a sequence of data values, each data value associated with a timestamp value and representing a head-room value for a task associated with the timestamp value. The task may be associated with the timestamp value since the task started execution at the time of the timestamp value. Alternatively, the task may have registered with a computing system at the time associated with the timestamp value. In an embodiment, the data value for a timestamp may be an aggregate head-room value for a set of tasks associated with the timestamp.

The trend analysis module 365 accesses a prediction model configured to receive an input timestamp value and predict a value of head-room for the task at the time represented by the input timestamp value. The trend analysis module 365 predicts a plurality of data values of the time series using the prediction model. For each of the plurality of predicted data values, the trend analysis module 365 determines an error residue value representing a measure of difference between the predicted data value and a data value of the time series. The trend analysis module 365 determines 1030 a change-point based on the error residue values and also the trend after the occurrence of the change-point. The change point represents a change in an aggregate measure of level of the error residue.

The corrective action module 320 performs a corrective action for adjusting the configuration of the production systems based on the change-point and the trend following its occurrence. For example, the change-point may indicate an increase in head-room value of tasks and the corrective action module 320 may send a request recommending increase in resources used for execution of the tasks based on the new trend occurring after the change-point.

Monitoring Key Performance Indicators

According to some embodiments, the techniques disclosed are used for long-term monitoring of some key performance indicators (KPIs) where growth rate needs to be monitored, for example, average number of users visiting a website or using a service, average number of failures experienced by a system (say, number of HTTP timeouts in a web-server), and inventory size. The system takes corrective actions depending on the KPI. In some embodiments, these actions are business decisions. For example, number of users could be used to decide on how to scale infra and other staffing investments, how to target advertising campaigns, and so on.

Figure 11:
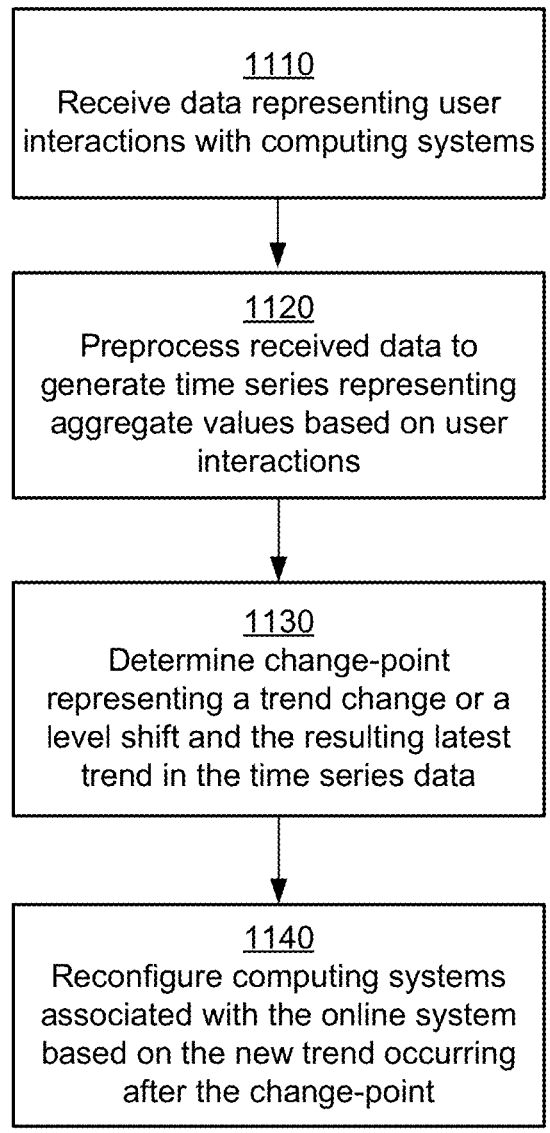
FIG. 11 shows a flowchart illustrating the process for analyzing time series representing user interactions with computing systems, according to an embodiment.

FIG. 11 shows a flowchart illustrating the process for analyzing data describing completion of tasks, according to an embodiment. The time series data collection module 310 receives 1110 data representing user interactions with computing systems. The received data may represent user interactions with online systems, for example, websites. The received data may represent user interactions with applications executing on client devices. The time series preprocessing module 360 preprocesses 1120 the received data to obtain a time series representing aggregate values based on the user interactions. The time series comprising a sequence of data values, each data value associated with a timestamp value. Each data value may represent an aggregate value based on the user interactions associated with the timestamp value. For example, the online system may store user profile information including demographics of various users such as age, gender, location, earnings, and so on. Each data value of the time series may represent aggregate user interactions for users having particular demographic attributes. Each data value may represent aggregate user interactions of a particular type, for example, user interactions representing search requests, user interactions representing online transactions, user interactions representing content access (e.g., viewing certain content such as videos, images, or text content), user interactions representing customer service requests, and so on. The data value at a particular time may represent data describing user interactions aggregated over a related time interval, for example, the time since the previous timestamp value of the time series.

The trend analysis module 365 accesses a prediction model configured to receive an input timestamp value and predict a data value representing aggregate user interactions associated with a time represented by the input timestamp value. The trend analysis module 365 predicts a plurality of data values of the time series using the prediction model. For each of the plurality of predicted data values, the trend analysis module 365 determines an error residue value representing a measure of difference between the predicted data value and a data value of the time series. The trend analysis module 365 determines 1130 a change-point based on the error residue values and the latest trend after the change-point. The change point represents a change in an aggregate measure of level of the error residue.

The corrective action module 320 performs a corrective action based on the change-point and the trend that following its occurrence, for example, by reconfiguring 1140 the computing systems associated with the online system to handle the effects of these events. For example, the change-point may indicate an increase in user interactions associated with certain product or service and the corrective action module 320 recommends (or automatically adjusts) advertisements associated with that product for sending to users. As another example, the change-point may indicate an increase in user interactions associated with certain product or service received from a set of users satisfying certain demographic profile and the corrective action module 320 recommends increasing the rate of (or automatically increases the rate of) advertisements of the product targeted at users having that demographic profile. In other embodiments, the corrective action module 320 recommends increasing the resources available (or automatically reconfigures systems) for processing requests associated with the user actions, for example, by adding additional computing resources, storage resources, or memory resources for processing requests associated with user interaction.

Computing Machine Architecture

Figure 12:
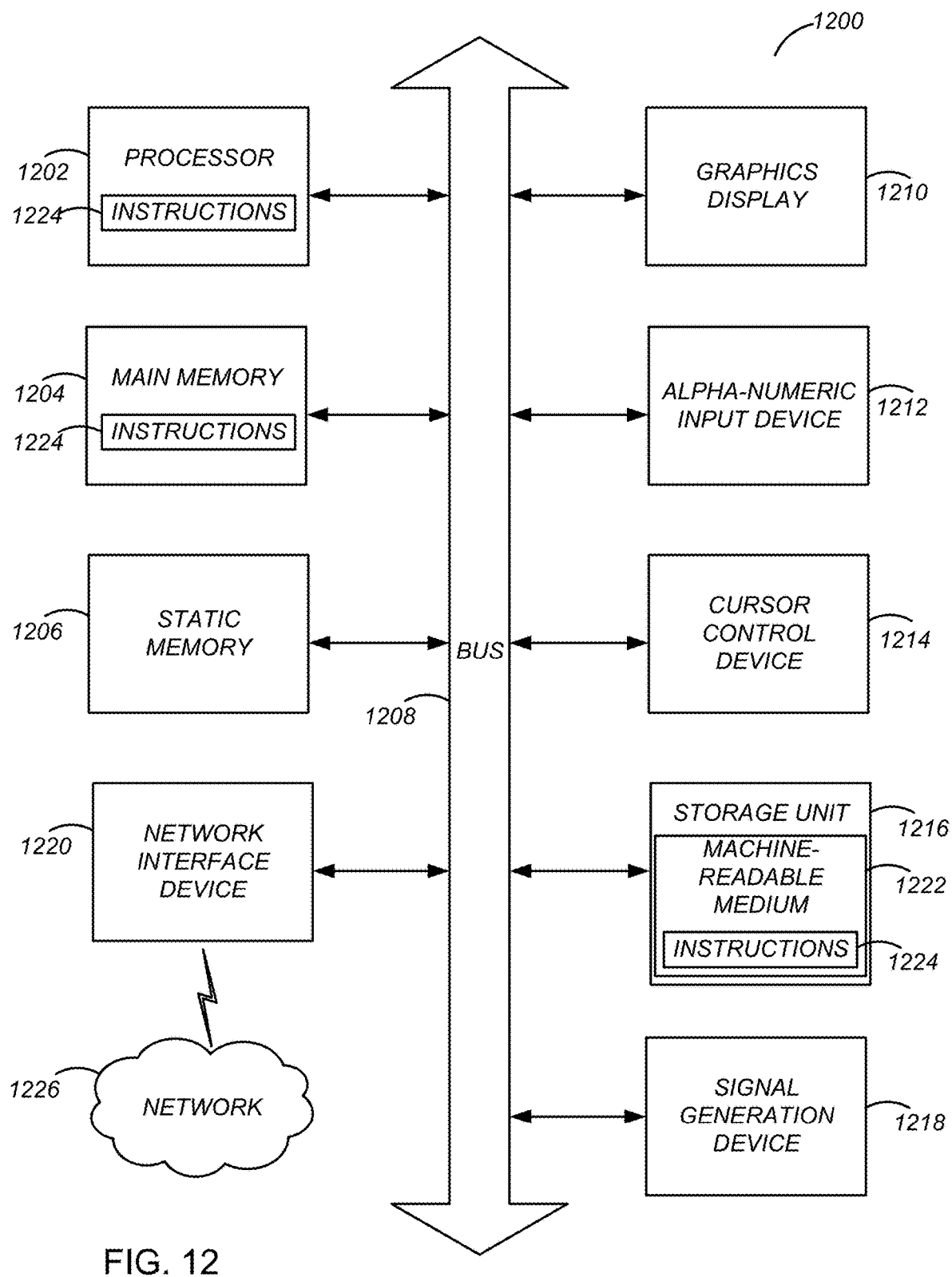
FIG. 12 is a block diagram illustrating components of an example machine able to read instructions from a machine-readable medium and execute them in a processor (or controller).

FIG. 12 is a block diagram illustrating components of an example machine able to read instructions from a machine-readable medium and execute them in a processor (or controller). Specifically, FIG. 12 shows a diagrammatic representation of a machine in the example form of a computer system 1200 within which instructions 1224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 includes a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which are configured to communicate with each other via a bus 1208. The computer system 1200 may further include graphics display unit 1210 (e.g., a plasma display panel (PDP), a liquid crystal display (LCD), a projector, or a cathode ray tube (CRT)). The computer system 1200 may also include alphanumeric input device 1212 (e.g., a keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which also are configured to communicate via the bus 1208.

The storage unit 1216 includes a machine-readable medium 1222 on which is stored instructions 1224 (e.g., software) embodying any one or more of the methodologies or functions described herein. The instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but not be limited to, data repositories in the form of solid-state memories, optical media, and magnetic media.

Alternative Embodiments

It is to be understood that the figures and descriptions of the present invention have been simplified to illustrate elements that are relevant for a clear understanding of the present invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for performing capacity management of a computer network, the method comprising:
   receiving, from one or more devices, data representing communications in a computer network associated with the one or more devices;
   determining a time series representing network utilization data based on the received data, the time series comprising a sequence of data values, each data value associated with a timestamp value and representing network utilization associated with a time represented by the timestamp value;
   accessing a prediction model configured to receive an input timestamp value and predict a data value of the time series corresponding to the input timestamp value, the predicted data value representing network utilization data associated with a input timestamp;
   predicting a plurality of data values of the time series using the prediction model;
   for each of the plurality of predicted data values, determining an error residue value representing a measure of difference between the predicted data value and a data value of the time series;
   determining a change-point based on the error residue values, the change point representing a change in an aggregate measure of level of the error residue; and
   performing a corrective action for the computer network based on the change-point.

2. The computer-implemented method of claim 1, wherein the prediction model is a first prediction model, the method further comprising:
   determining a second prediction model based on data values of the timestamp that occur after the change point; and
   wherein performing the corrective action for the computer network is based on predictions made by the second prediction model.

3. The computer-implemented method of claim 1, wherein the received data represents link utilization measurements representing data transfer rate between routers or other devices in the computer network.

4. The computer-implemented method of claim 1, wherein determining the change-point in the error residue values comprises:
   determining a total aggregate value corresponding to data values of the time series;
   determining a partial aggregate value corresponding to each of a set of timestamp values;
   determining a secondary time series based on a difference between the partial aggregate values and the total aggregate values;
   identifying a timestamp associated with a shift in level of values in the secondary time series; and
   providing the identified timestamp as a timestamp corresponding to the change-point.

5. The computer-implemented method of claim 4, wherein the partial aggregate value is a cumulative partial sum of data values of the time series and the total aggregate value is a cumulative sum of data values of the time series.

6. The computer-implemented method of claim 1, wherein determining the time series comprises:
   for each of a plurality of sub-intervals, aggregating the received data across the sub-interval;
   using each aggregate value for a sub-interval as a data value of the time series, the data value corresponding to a timestamp associated with the sub-interval;
   determining a median value across a sliding window; and
   responsive to a received data value deviating from the median value by more than a threshold value, using the median value instead of the received data value.

7. The computer-implemented method of claim 1, wherein the prediction model is a machine learning based regression model, the method further comprising:
   training the machine learning based regression model using data values from the time series.

8. The computer-implemented method of claim 1, wherein performing the corrective action comprises one or more of:
   sending an alert describing the change-point and a trend following its occurrence; and
   processing instructions to reconfigure a portion of the computer network.

9. A computer-implemented method comprising:
   receiving data describing time of completion of tasks, each task associated with a deadline for completing the task;
   determining a time series representing head-room values of tasks, wherein a head-room value represents a difference between a deadline for completion of the task and the time of completion of the task, the time series comprising a sequence of data values, each data value associated with a timestamp value associated with a task and representing a headroom value for the task associated with the timestamp value;
   accessing a prediction model configured to receive an input timestamp value associated with a particular task and predict the headroom value for the particular task;
   predicting a plurality of data values of the time series using the prediction model;
   for each of the plurality of predicted data values, determining an error residue value representing a measure of difference between the predicted data value and a data value of the time series;
   determining a change-point based on the error residue values, the change point representing a change in an aggregate measure of level of the error residue; and
   performing a corrective action for adjusting the headroom value of tasks processed after the change-point.

10. The computer-implemented method of claim 9, wherein the prediction model is a first prediction model, the method further comprising:
    determining a second prediction model based on data values of the timestamp that occur after the change point; and
    wherein performing the corrective action is based on predictions made by the second prediction model.

11. The computer-implemented method of claim 9, wherein determining the change-point in the error residue values comprises:
    determining a total aggregate value corresponding to data values of the time series;

determining a partial aggregate value corresponding to each of a set of timestamp values;
determining a secondary time series based on a difference between the partial aggregate values and the total aggregate values;
identifying a timestamp associated with a shift in level of values in the secondary time series; and
providing the identified timestamp as a timestamp corresponding to the change-point.

12. The computer-implemented method of claim 11, wherein the partial aggregate value is a cumulative partial sum of data values of the time series and the total aggregate value is a cumulative sum of data values of the time series.

13. The computer-implemented method of claim 9, wherein determining the time series comprises one or more of:
for each of a plurality of sub-intervals, determining an aggregate value by aggregating the input values across the sub-interval;
using each aggregate value for a sub-interval as a data value of the time series, the data value corresponding to a timestamp associated with the sub-interval;
determining a median value across a sliding window; and
responsive to a network data value deviating from the median value by more than a threshold value, using the median value instead of the received data value.

14. The computer-implemented method of claim 9, wherein the prediction model is a machine learning based regression model, the method further comprising:
training the machine learning based regression model using data values from the time series.

15. The computer-implemented method of claim 9, wherein performing the corrective action comprises one or more of:
sending an alert describing the change-point and a resulting trend after its occurrence; and
processing instructions to reconfigure resources for processing the tasks processed after the change-point.

16. A computer-implemented method for performing corrective actions based on trend change or mean-shift change-points in user interactions with computing systems, the method comprising:
receiving data describing user interactions with computing systems;
determining a time series representing values of a metric based on aggregate values of data describing the user interactions, the time series comprising a sequence of data values, each data value associated with a timestamp value and representing a value of the metric based on aggregate values of data describing user interactions corresponding to the timestamp value;
accessing a prediction model configured to receive an input timestamp value and predict the value of the metric based on aggregate values of data describing user interactions corresponding to the input timestamp value;
predicting a plurality of data values of the time series using the prediction model;
for each of the plurality of predicted data values, determining an error residue value representing a measure of difference between the predicted data value and a data value of the time series;
determining a change-point based on the error residue values, the change point representing a change in an aggregate measure of level of the error residue; and
performing a corrective action associated with user interactions performed after the change-point.

17. The computer-implemented method of claim 16, wherein the prediction model is a first prediction model, the method further comprising:
determining a second prediction model based on data values of the timestamp that occur after the change point; and
wherein performing the corrective action is based on predictions made by the second prediction model.

18. The computer-implemented method of claim 16, wherein determining the change-point in the error residue values comprises:
determining a total aggregate value corresponding to data values of the time series;
determining a partial aggregate value corresponding to each of a set of timestamp values;
determining a secondary time series based on a difference between the partial aggregate values and the total aggregate values;
identifying a timestamp associated with a shift in level of values in the secondary time series; and
providing the identified timestamp as a timestamp corresponding to the change-point.

19. The computer-implemented method of claim 18, wherein the partial aggregate value is a cumulative partial sum of data values of the time series and the total aggregate value is a cumulative sum of data values of the time series.

20. The computer-implemented method of claim 16, wherein determining the time series comprises one or more of:
for each of a plurality of sub-intervals, determining an aggregate value by aggregating the input values across the sub-interval;
using each aggregate value for a sub-interval as a data value of the time series, the data value corresponding to a timestamp associated with the sub-interval;
determining a median value across a sliding window; and
responsive to a network data value deviating from the median value by more than a threshold value, using the median value instead of the received data value.

21. The computer-implemented method of claim 16, wherein the prediction model is a machine learning based regression model, the method further comprising:
training the machine learning based regression model using data values from the time series.

22. The computer-implemented method of claim 16, wherein performing the corrective action comprises one or more of:
sending an alert describing the change-point and a resulting trend after its occurrence;
processing instructions to reconfigure resources for processing user interactions processed after the change-point; and
modifying distribution of content items after the change-point.

23. A non-transitory computer readable storage medium comprising instructions that, when executed by a processor, cause the processor to:
receive, from one or more devices, data representing communications in a computer network associated with the one or more devices;
determine a time series representing network utilization data based on the received data, the time series comprising a sequence of data values, each data value associated with a timestamp value and representing network utilization associated with a time represented by the timestamp value;

access a prediction model configured to receive an input timestamp value and predict a data value of the time series corresponding to the input timestamp value, the predicted data value representing network utilization data associated with the input timestamp;

predict a plurality of data values of the time series using the prediction model;

for each of the plurality of predicted data values, determine an error residue value representing a measure of difference between the predicted data value and a data value of the time series;

determine a change-point based on the error residue values, the change point representing a change in an aggregate measure of level of the error residue; and perform a corrective action for the computer network based on the change-point.

24. The non-transitory computer readable storage medium of claim 23, wherein the prediction model is a first model, and wherein the instructions further cause the processor to:

determine a second prediction model based on data values of the timestamp that occur after the change point; and wherein the instructions that cause the processor to perform the corrective action correspond to instructions that cause the processor to perform the corrective action based on predictions made by the second prediction model.

25. The non-transitory computer readable storage medium of claim 23, wherein the received data represents link utilization measurements representing data transfer rate between routers or other devices in the computer network.

26. The non-transitory computer readable storage medium of claim 23, wherein the instructions that cause the processor to determine the change-point in the error residue values correspond to instructions that cause the processor to:

determine a total aggregate value corresponding to data values of the time series;

determine a partial aggregate value corresponding to each of a set of timestamp values;

determine a secondary time series based on a difference between the partial aggregate values and the total aggregate values;

identify a timestamp associated with a shift in level of values in the secondary time series; and provide the identified timestamp as a timestamp corresponding to the change-point.

27. The non-transitory computer readable storage medium of claim 26, wherein the partial aggregate value is a cumulative partial sum of data values of the time series and the total aggregate value is a cumulative sum of data values of the time series.

28. The non-transitory computer readable storage medium of claim 23, wherein the instructions that cause the processor to determine the time series correspond to instructions that cause the processor to:

for each of a plurality of sub-intervals, aggregate the received data across the sub- interval;

use each aggregate value for a sub-interval as a data value of the time series, the data value corresponding to a timestamp associated with the sub-interval;

determine a median value across a sliding window; and responsive to a received data value deviating from the median value by more than a threshold value, use the median value instead of the received data value.

29. The non-transitory computer readable storage medium of claim 23, wherein the prediction model is a machine learning based regression model, and wherein the instructions further cause the processor to:

train the machine learning based regression model using data values from the time series.

30. The non-transitory computer readable storage medium of claim 23, wherein instructions that cause the processor to perform the corrective action correspond to instructions that cause the processor to:

send an alert describing the change-point and a trend following its occurrence; and process instructions to reconfigure a portion of the computer network.

31. A non-transitory computer readable storage medium comprising instructions that, when executed by a processor, cause the processor to:

receive data describing time of completion of tasks, each task associated with a deadline for completing the task;

determine a time series representing head-room values of tasks, wherein a head-room value represents a difference between a deadline for completion of the task and the time of completion of the task, the time series comprising a sequence of data values, each data value associated with a timestamp value associated with a task and representing a headroom value for the task associated with the timestamp value;

access a prediction model configured to receive an input timestamp value associated with a particular task and predict the headroom value for the particular task;

predict a plurality of data values of the time series using the prediction model;

for each of the plurality of predicted data values, determine an error residue value representing a measure of difference between the predicted data value and a data value of the time series;

determine a change-point based on the error residue values, the change point representing a change in an aggregate measure of level of the error residue; and perform a corrective action for adjusting the head-room value of tasks processed after the change-point.

32. The non-transitory computer readable storage medium of claim 31, wherein the prediction model is a first model, and wherein the instructions further cause the processor to:

determine a second prediction model based on data values of the timestamp that occur after the change point; and wherein the instructions that cause the processor to perform the corrective action correspond to instructions that cause the processor to perform the corrective action based on predictions made by the second prediction model.

33. The non-transitory computer readable storage medium of claim 31, wherein the instructions that cause the processor to determine the change-point in the error residue values correspond to instructions that cause the processor to:

determine a total aggregate value corresponding to data values of the time series;

determine a partial aggregate value corresponding to each of a set of timestamp values;

determine a secondary time series based on a difference between the partial aggregate values and the total aggregate values;

identify a timestamp associated with a shift in level of values in the secondary time series; and provide the identified timestamp as a timestamp corresponding to the change-point.

34. The non-transitory computer readable storage medium of claim 33, wherein the partial aggregate value is a cumulative partial sum of data values of the time series and the total aggregate value is a cumulative sum of data values of the time series.

35. The non-transitory computer readable storage medium of claim 31, wherein the instructions that cause the processor to determine the time series correspond to instructions that cause the processor to:
  for each of a plurality of sub-intervals, determine an aggregate value by aggregating the input values across the sub-interval;
  use each aggregate value for a sub-interval as a data value of the time series, the data value corresponding to a timestamp associated with the sub-interval;
  determine a median value across a sliding window; and
  responsive to a network data value deviating from the median value by more than a threshold value, use the median value instead of the received data value.

36. The non-transitory computer readable storage medium of claim 31, wherein the prediction model is a machine learning based regression model, and wherein the instructions further cause the processor to:
  train the machine learning based regression model using data values from the time series.

37. The non-transitory computer readable storage medium of claim 31, wherein instructions that cause the processor to perform the corrective action correspond to instructions that cause the processor to:
  send an alert describing the change-point and a resulting trend following its occurrence; and
  process instructions to reconfigure resources for processing the tasks processed after the change-point.

38. A non-transitory computer readable storage medium comprising instructions that, when executed by a processor, cause the processor to:
  receive data describing user interactions with computing systems;
  determine a time series representing values of a metric based on aggregate values of data describing the user interactions, the time series comprising a sequence of data values, each data value associated with a timestamp value and representing a value of the metric based on aggregate values of data describing user interactions corresponding to the timestamp value;
  access a prediction model configured to receive an input timestamp value and predict the value of the metric based on aggregate values of data describing user interactions corresponding to the input timestamp value;
  predict a plurality of data values of the time series using the prediction model;
  for each of the plurality of predicted data values, determine an error residue value representing a measure of difference between the predicted data value and a data value of the time series;
  determine a change-point based on the error residue values, the change point representing a change in an aggregate measure of level of the error residue; and
  perform a corrective action associated with user interactions performed after the change-point.

39. The non-transitory computer readable storage medium of claim 38, wherein the prediction model is a first model, and wherein the instructions further cause the processor to:
  determine a second prediction model based on data values of the timestamp that occur after the change point; and
  wherein the instructions that cause the processor to perform the corrective action correspond to instructions that cause the processor to perform the corrective action based on predictions made by the second prediction model.

40. The non-transitory computer readable storage medium of claim 38, wherein the instructions that cause the processor to determine the change-point in the error residue values correspond to instructions that cause the processor to:
  determine a total aggregate value corresponding to data values of the time series;
  determine a partial aggregate value corresponding to each of a set of timestamp values;
  determine a secondary time series based on a difference between the partial aggregate values and the total aggregate values;
  identify a timestamp associated with a shift in level of values in the secondary time series; and
  provide the identified timestamp as a timestamp corresponding to the change-point.

41. The non-transitory computer readable storage medium of claim 38, wherein the partial aggregate value is a cumulative partial sum of data values of the time series and the total aggregate value is a cumulative sum of data values of the time series.

42. The non-transitory computer readable storage medium of claim 38, wherein the instructions that cause the processor to determine the time series correspond to instructions that cause the processor to:
  for each of a plurality of sub-intervals, determine an aggregate value by aggregating the input values across the sub-interval;
  use each aggregate value for a sub-interval as a data value of the time series, the data value corresponding to a timestamp associated with the sub-interval;
  determine a median value across a sliding window; and
  responsive to a network data value deviating from the median value by more than a threshold value, use the median value instead of the received data value.

43. The non-transitory computer readable storage medium of claim 38, wherein the prediction model is a machine learning based regression model, and wherein the instructions further cause the processor to:
  train the machine learning based regression model using data values from the time series.

44. The non-transitory computer readable storage medium of claim 38, wherein instructions that cause the processor to perform the corrective action correspond to instructions that cause the processor to:
  sending an alert describing the change-point and a resulting trend after its occurrence;
  processing instructions to reconfigure resources for processing user interactions processed after the change-point; and
  modifying distribution of content items after the change-point.

* * * * *